United States Patent [19]

Yaindl

[11] Patent Number: 4,693,270
[45] Date of Patent: Sep. 15, 1987

[54] CHECK VALVE

[75] Inventor: Charles Yaindl, Allentown, Pa.

[73] Assignee: Durabla Manufacturing Co., Lionville, Pa.

[21] Appl. No.: 843,308

[22] Filed: Mar. 24, 1986

[51] Int. Cl.$^4$ ............................................. F16K 15/02
[52] U.S. Cl. ............................... 137/514.3; 137/513.3
[58] Field of Search ............................ 137/513.3, 514.3

[56] References Cited

U.S. PATENT DOCUMENTS

| | | |
|---|---|---|
| 328,979 | 10/1885 | Schutte ............................. 137/514.3 |
| 915,624 | 3/1909 | Perkins ............................. 137/514.3 |
| 2,094,951 | 10/1937 | Kowan . |
| 2,391,211 | 12/1945 | White ............................. 137/513.3 |
| 3,086,550 | 4/1963 | Cummings . |
| 3,109,450 | 11/1963 | Hardcastle . |
| 3,280,840 | 10/1966 | Shirey . |
| 3,361,158 | 1/1968 | Swift . |
| 3,422,843 | 1/1969 | Blackman . |
| 3,605,802 | 9/1971 | Hertell . |
| 3,857,408 | 12/1974 | Rhodes . |
| 3,942,551 | 3/1976 | Schuller . |
| 4,257,453 | 3/1981 | Kohnke . |
| 4,315,524 | 2/1982 | Hoffmann . |
| 4,330,006 | 5/1982 | Eck . |
| 4,340,085 | 7/1982 | Crawford . |
| 4,345,736 | 8/1982 | Zeuner . |
| 4,531,709 | 7/1985 | Maddalozzo . |

FOREIGN PATENT DOCUMENTS 769699 8/1934 France ............................. 137/514.3
615304 7/1978 U.S.S.R. ............................. 137/514.3

Primary Examiner—Robert G. Nilson
Attorney, Agent, or Firm—William H. Eilberg

[57] ABSTRACT

An improved check valve is disclosed, which prevents the valve disk from slamming against the valve seat when the fluid flow in the line is suddenly reversed. The valve includes a disk and a seat, the disk being movable towards and away from the seat in response to pressure changes in the line. The disk, together with a central member, defines a chamber which becomes filled with fluid when the disk moves away from the seat. When the direction of flow in the line is suddenly reversed, causing the disk to move back towards the seat, the disk is cushioned by the fluid in the chamber, and does not slam against the seat. In one embodiment, an orifice is provided, spaced apart from the central bore of the valve, through which the fluid in the chamber can slowly and steadily leak out. In another embodiment, the orifice is provided in the disk of a pilot valve, which is a small check valve mounted at the inlet end of the main valve. In either embodiment, the orifice causes fluid to leak out of the chamber in a controlled manner. The fluid in the chamber therefore acts as a dashpot to retard the movement of the disk towards the seat. The amount of damping of the dashpot is determined by the size of the orifice.

14 Claims, 7 Drawing Figures

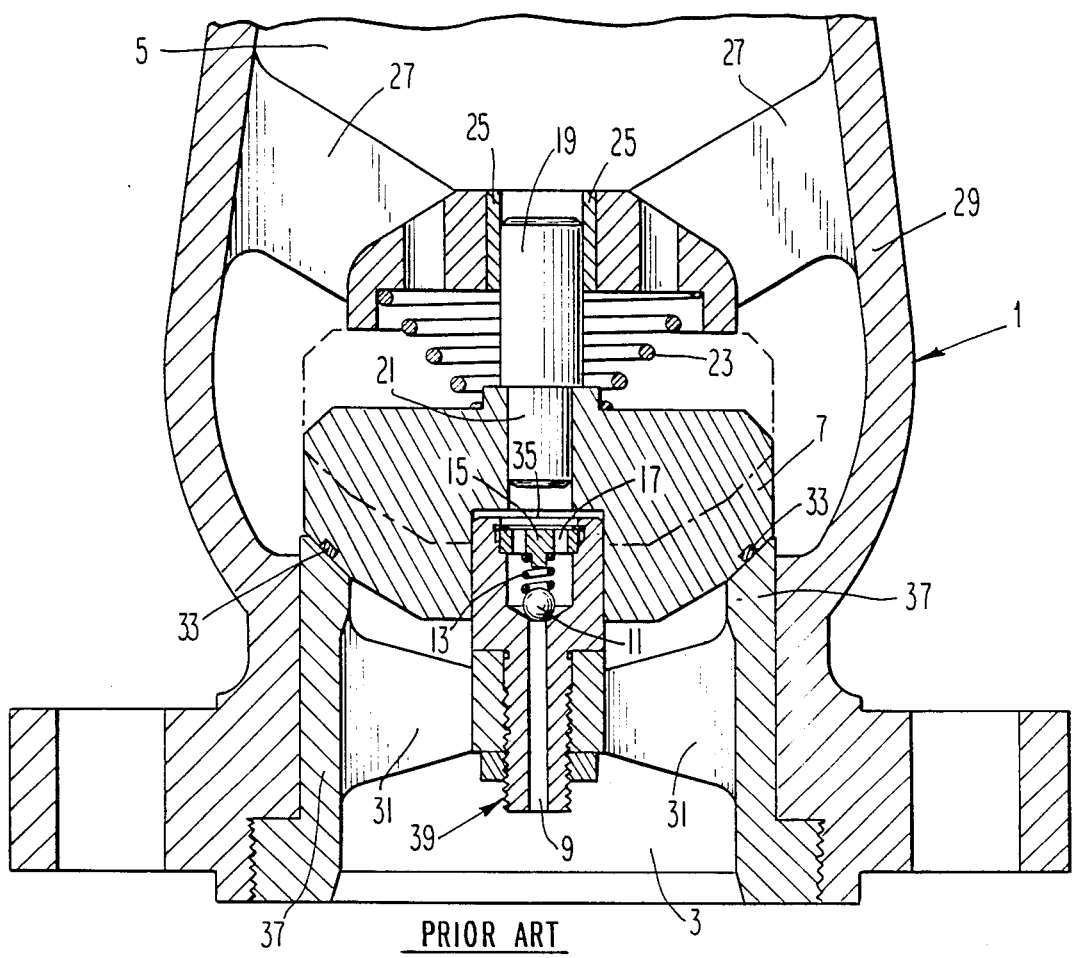
PRIOR ART
Fig. 1
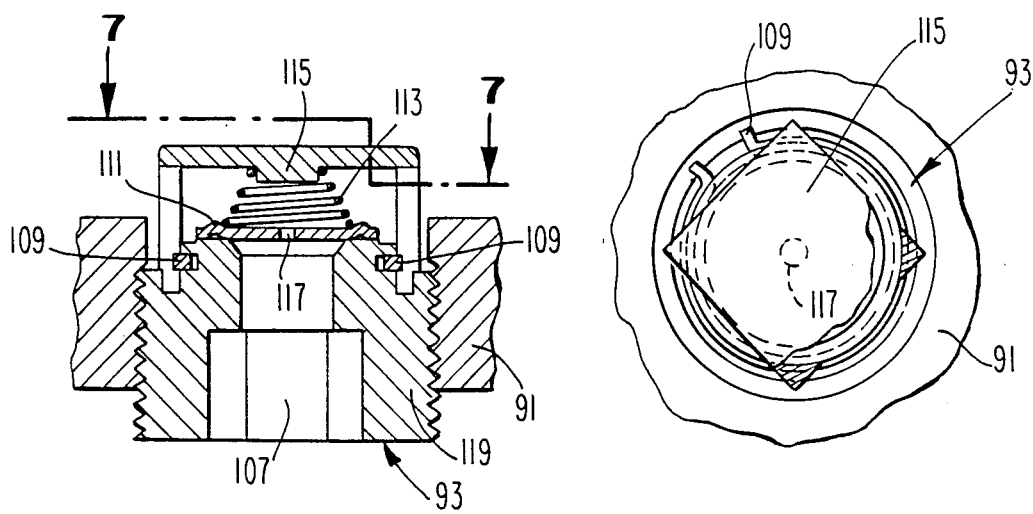
Fig. 6
Fig. 7

CHECK VALVE

BACKGROUND OF THE INVENTION

This invention relates to the field of check valves, and, in particular, addresses the problem of banging or slamming of the valve disk against the valve seat, due to sudden reversals of flow in the line.

Check valves, i.e. valves which allow fluid to flow through the valve in only one direction, have been known for a long time. The typical check valve includes a disk (also known as a "clapper", or simply a "valve element", among other names) which is biased by a spring means, or by gravity, to rest against a seat. The disk is forced away from the seat by the pressure of an incoming fluid. Movement of the disk away from the seat opens a path for fluid to flow through the valve.

When the direction of flow of fluid in the line is suddenly reversed, the valve described above tends to close immediately. The disk is immediately forced against the seat, by the combined action of the spring means, or gravity, and the line fluid itself. When the fluid line is connected to a reciprocating compressor which, due to defects in the compressor's discharge valves, draws some fluid back on its return stroke, the slamming of the disk of the check valve can be especially severe. Such compressors typically operate at rates of the order of 350 strokes per minute, and the valve disk therefore tends to move with these strokes, slamming repeatedly against its seat. This slamming, or "chatter", can eventually damage or destroy the valve.

Because of the slamming problem, some check valves have been limited to use with liquids, whose pressures are less variable than those of a gas. Such valves could occasionally be used with gases, but only when the gas flow was expected to be fairly uniform. But in many other applications, such as with the compressor mentioned above, the changes in the direction of gas flow may be large and frequent, and the problem of slamming must be addressed.

Many solutions have been proposed, in the prior art, for the problem of the slamming of the valve disk. One solution is to provide some kind of damping means for cushioning the motion of the disk, as it moves towards its seat. Such a damping means is shown in U.S. Pat. No. 4,330,006, wherein a fluid cushions the return of the disk, and flows out of the valve, relatively slowly, through the clearances between the valve components. Another example of a fluid damping device is shown in U.S. Pat. No. 3,086,550, which provides an air chamber to cushion the valve disk.

Other examples of patents which disclose the use of a fluid chamber for damping the movement of a valve disk include U.S. Pat. Nos. 3,857,408, 4,315,524, and 3,422,843. Other patents show structures which damp the movement of the disk by mechanical linkages, and the like. Examples include U.S. Pat. Nos. 4,340,085 and 3,109,450.

In check valves which are damped by a fluid chamber, the chamber is generally defined by the valve disk and valve seat, or by a valve disk and a central member or wall adjacent the seat. The chamber is filled with fluid as the disk is moved away from the seat, and the disk therefore pushes against the fluid as it returns towards the seat. The fluid which is pushed out of the chamber therefore is forced through the clearances between the disk and its surrounding structure, to the outside.

Check valves which are clamped by a fluid are preferred over those which are damped by mechanical means. Fluid-damped valves require fewer components, and therefore are easier and less expensive to build, and are likely to be more reliable in operation. The fluid to be used for damping purposes can be easily "borrowed" from the fluid flowing in the line.

The problem with fluid-damped check valves is the irregularity of the path through which the damping fluid escapes. It is difficult, if not impossible, to maintain a precise tolerance between the disk and the adjacent components. During the life of the valve, the constant flow of fluid through the clearances between the valve components causes the size of these clearances to change, and therefore changes the rate of damping of the movement of the disk. It is important to provide a controlled rate of flow of the damping fluid out of the valve.

The present invention provides a solution to the problem described above. The invention includes a check valve wherein the movement of the valve disk is damped by a fluid, and wherein the fluid flwos out of the valve at a controlled rate, when the disk is moving towards its seat. The disk can therefore return to the seat only if the pressure in the line remains low for an extended period of time. If the disk does return to the seat, it will do so without slamming.

SUMMARY OF THE INVENTION

In one embodiment of the invention, a check valve is provided with an inlet channel formed in a central bore. Incoming fluid enters the channel, and pushes a spring-biased ball. The fluid flows around the ball and pushes against a valve disk. The disk is also spring-biased, so that, in the absence of pressure in the line, the disk will rest on a seat. When the line pressure increases, the fluid in the line pushes the disk away from its seat, opening a path for fluid flow through the valve.

The disk, together with a central member immediately adjacent the disk, defines a chamber, into which fluid from the input stream can flow. As the disk moves away from the seat, the chamber increases in volume and becomes pressurized with fluid. When the fluid pressure in the line drops, or when the direction of fluid flow is reversed, the disk is urged back towards its seat, both by the action of the spring and by the reversed flow itself. When the disk is moving back towards the seat, the fluid in the chamber becomes compressed, and resists the movement of the disk. The fluid in the chamber therefore acts as a dashpot which slows the movement of the disk, and prevents the disk from slamming against the seat. The central member includes an orifice, through which fluid in the chamber can escape at a controlled rate. The size of the orifice determines the rate of emptying of the chamber, and therefore governs the damping coefficient of the dashpot.

In another embodiment of the invention, the orifice is provided as part of a pilot valve, which is a small check valve mounted at the inlet end of the main valve. The pilot valve allows incoming fluid to enter the main valve, and to push the disk of the main valve away from its seat. The pilot valve has a disk of its own, and this disk has an orifice.

As in the first embodiment, the disk of the main valve and a central member together define a fluid chamber which becomes filled as the disk moves away from the seat. When the flow of fluid into the chamber ceases, the spring of the pilot valve will urge its disk against its seat. When the line flow is reversed, and the main disk moves back towards the seat, the fluid in the chamber is compressed and its pressure increased. Fluid then flows out of the chamber through the orifice in the disk of the pilot valve. The disk of the main valve cannot reach its seat until substantially all of the fluid in the chamber has been forced out of the orifice. The disk therefore cannot suddenly slam against its seat. This second embodiment therefore comprises a valve within a valve. The smaller pilot valve provides the orifice for controlled flow of fluid out of the chamber.

The invention also includes a valve construction which makes more efficient use of materials than has been possible with valves of the prior art. In particular, the thickness of the central member, or wall, of the valve is greatly reduced, according to the present invention, and the cross-sectional area through which fluid can flow through the valve is substantially increased, without appreciably increasing the size of the valve. In this construction, the disk and the central member are shaped so that the fluid chamber is not purely cylindrical, as has been common in the prior art. The disk is not actually a flat disk, but instead is a cup-shaped member defining a recess which provides a large volume compression chamber to respond more efficiently to pressure of the incoming fluid.

It is therefore an object of the invention to provide a check valve wherein the valve disk is prevented from slamming against the valve seat when the flow in the line is reversed.

It is another object of the invention to increase the useful life of check valves.

It is another object of the invention to provide a check valve which is fluid damped.

It is another object of the invention to provide a damped check valve as described above, wherein the amount of damping can be precisely controlled.

It is another object of the invention to provide a check valve which makes efficient use of the space within the valve, and which minimizes the amount of material needed to construct the valve.

Other objects and advantages of the invention will be apparent to those skilled in the art, from a reading of the following brief description of the drawings, the detailed description of the invention, and the appended claims.

BRIEF DESCRIPTION OF THE DRAWINGS

FIG. 1 is a cross-sectional view of a gas-damped check valve of the prior art, showing the valve disk resting on its seat, and also illustrating, in dotted outline, the valve disk when forced away from the seat due to the flow of the incoming fluid.

FIG. 6 is a cross-sectional view of the pilot valve which is disposed at the inlet end of the check valve of FIGS. 4 and 5, taken along the line 6—6 of FIG. 4.

FIG. 7 is a view taken along the line 7—7 of FIG. 6, showing more of the structure of the pilot valve.

DETAILED DESCRIPTION OF THE INVENTION

Figure 2:
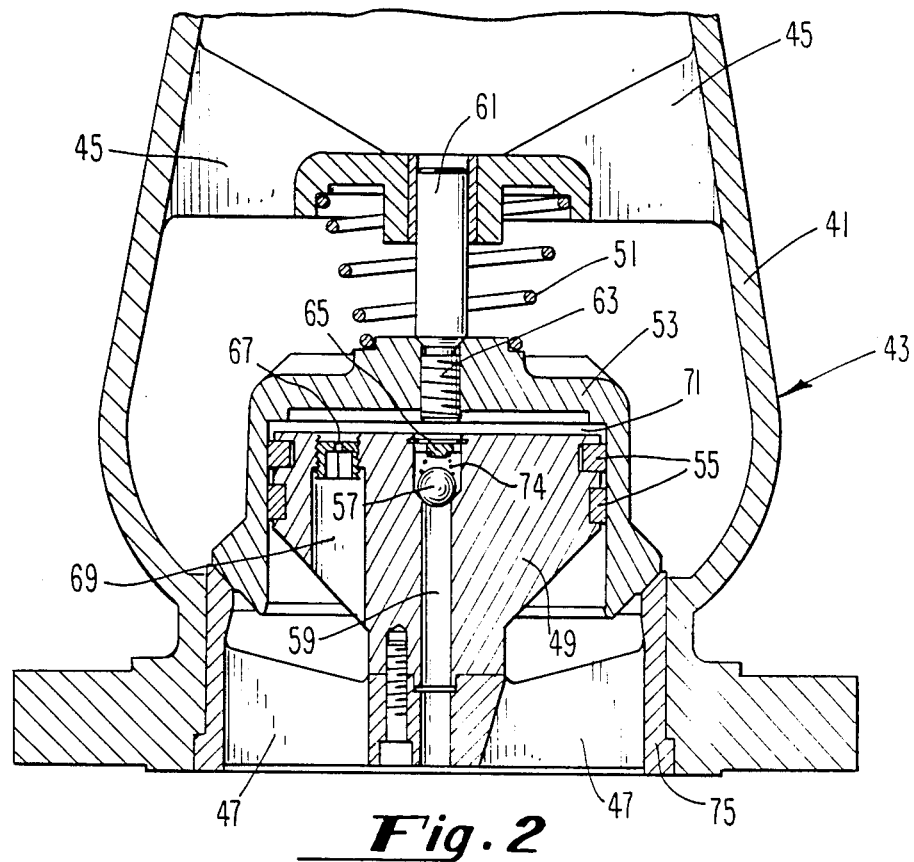
FIG. 2 is a cross-sectional view of a check valve made according to one embodiment of the invention, showing the valve disk resting on its seat.

In order to understand the present invention, it is necessary to understand the operation of fluid-damped valves of the prior art. FIG. 1 is a cross-sectional view of such a valve. Valve 1 is constructed of body 29, and has an inlet end 3, and an outlet end 5. Fluid enters at the inlet end and exits at the outlet end. The incoming fluid flows through channel 9 which comprises a bore in a central member or wall 39. The fluid pushes against ball 11, forcing the ball against spring 13. Spring 13 is connected to a perforated plate 15, the plate having at least one opening 17. Fluid passing through the plate then presses against valve disk 7.

Disk 7 rests upon seat 37. The seat is attached to the valve body 29, and has connecting ribs 31 which hold the central member 39 in place. The junction of disk 7 and seat 37 is sealed by seal 33. Disk 7 is held in place by a stepped stem having components designated by reference numerals 19 and 21. Pin 19 is mounted within bushing 25, which is connected, by ribs 27, to the valve body 29. Disk 7 is urged against the seat 37 by spring 23.

Disk 7 has a recess which, together with central member 39, defines a chamber 35. As the disk moves away from the seat and compresses spring 23 in response to the flow of incoming fluid, the chamber 35 grows in volume, and is filled with fluid from the inlet stream. While the pressure of the incoming fluid is maintained at a level sufficient to hold the disk against spring 23, the fluid flows freely through the valve, flowing through the opening created by movement of the disk 7 away from the seat 37. The position of disk 7, when pushed all the way against spring 23, is shown in dotted outline.

When the direction of flow in the line is reversed, the disk 7 is urged by spring 23, and by the fluid flow, towards seat 37. This movement of the disk towards seat 37 tends to compress the fluid in chamber 35. But the fluid in the chamber is trapped by ball 11, so the disk cannot reach the seat until it has forced most of the fluid out of the chamber. The fluid in the chamber therefore comprises a dashpot which damps the backward movement of the disk, and prevents the disk from slamming against the seat.

The problem with the prior art structure shown in FIG. 1 is that the flow of fluid out of chamber 35 is uncontrolled. The fluid flows through whatever clearances or openings are available, and these exit paths are likely to change in size with repeated use. The size of these clearances determines the effective damping coefficient of the dashpot. Thus, the damping coefficient of this prior art structure is not only uncertain, but is also likely to change with time.

Figure 3:
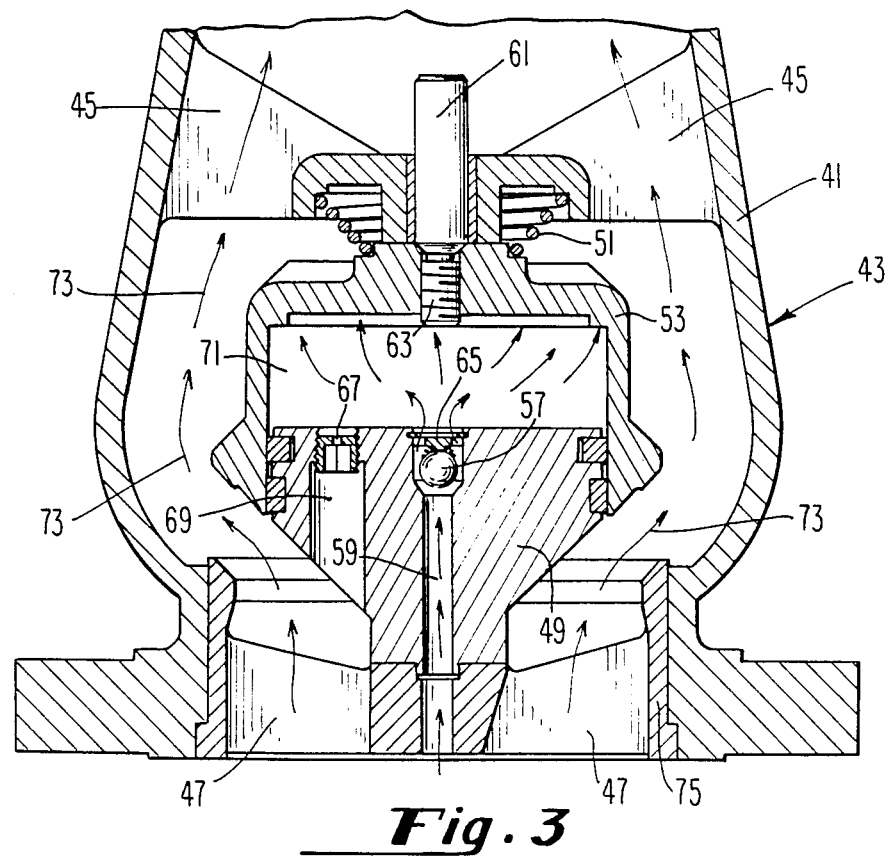
FIG. 3 is a cross-sectional view of the valve of FIG. 2, showing the disk forced away from its seat.

One embodiment of the present invention is shown in the crosssectional views of FIGS. 2 and 3. FIG. 2 shows the valve in the closed position; FIG. 3 shows the valve in the open position.

Throughout this specification, the term "disk" is used to describe the valve element which moves back and forth in response to the flow of fluid in the line, and which opens and closes the valve to fluid flow. In many of the valves of the prior art, the valve disk is, in fact, disk-shaped. In other valves, the "disk" assumes other shapes. In this specification, the term will be used to refer to the valve element, whether or not it actually assumes the shape of a disk.

In FIG. 2, valve 43 comprises a body 41, a central member 49, a disk 53, and a seat 75. The seat is connected to body 41, as shown, and is connected to central member 49 by ribs 47. Ribs 45 hold the disk assembly in place. The disk assembly includes a stepped stem, which has a nonthreaded portion 61 and a threaded portion 63, similar to the stepped stem shown in FIG. 1. Disk 53 is urged against seat 75 by spring 51. Disk 53 is sealed against central member 49 by sealing rings 55, which may be made of Teflon, or any other suitable bearing material.

Fluid flowing into the valve enters channel 59 and pushes against ball 57. Ball 57 is forced against spring 74, which is connected to plate 65, the plate having at least one opening to allow fluid to flow therethrough. Disk 53 and central member 49 together define fluid chamber 71, which grows in volume as the disk is pushed away from its seat. Chamber 71 is shown at its maximum volume in FIG. 3, where the disk has been pushed as far as it can move away from its seat. When the disk is pushed away from the seat, fluid can flow freely through the opening created by such movement, as indicated by the arrows 73.

As is true for the valve shown in FIG. 1, the chamber 71 comprises a dashpot which damps the movement of the disk, and prevents the disk from slamming against the seat when the direction of fluid flow in the line is suddenly reversed.

Central member 49 includes an orifice 67, which communicates with a bore 69. Orifice 67 provides a controlled path for fluid to flow out of chamber 71, when disk 53 is returning towards seat 75, and when the disk is therefore compressing the fluid in the chamber. The size of the orifice determines the rate at which the fluid in the chamber escapes. The orifice size therefore determines the damping coefficient of the dashpot. Because the chamber is tightly sealed against leakage, orifice 67 and bore 69 define the only path for escape of fluid from the chamber. The orifice thus provides a controlled means of escape of fluid, which remains substantially constant throughout the life of the valve.

Figure 4:
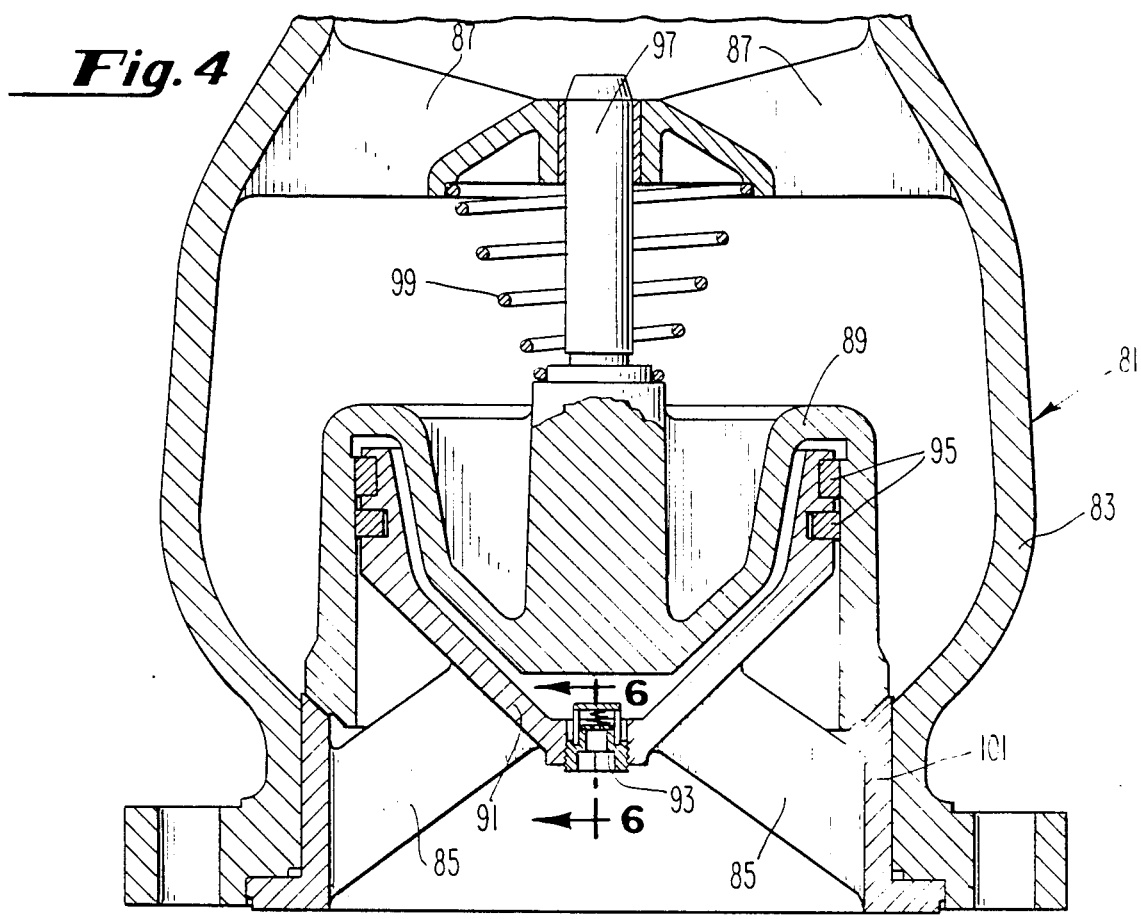
FIG. 4 is a cross-sectional view of a check valve made according to another embodiment of the invention, showing the valve disk resting on its seat.
Figure 5:
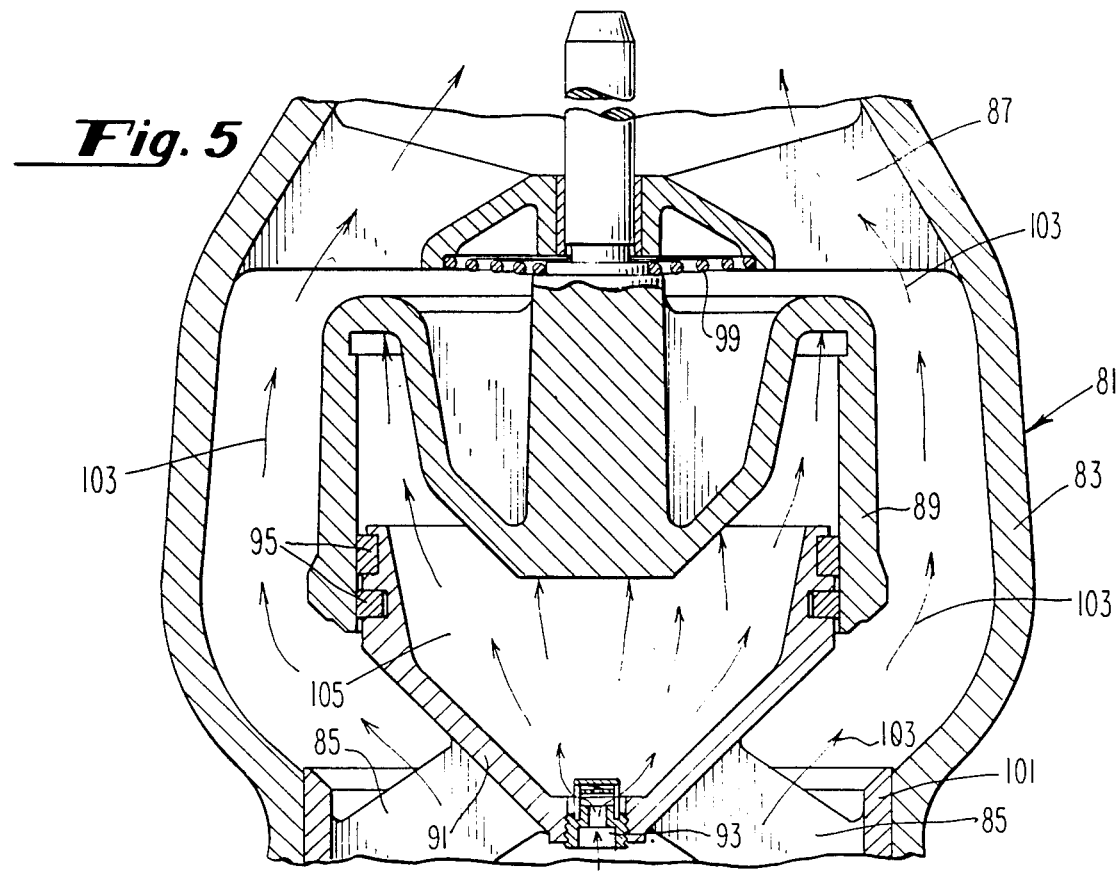
FIG. 5 is a cross-sectional view of the valve of FIG. 4, showing the disk forced away from its seat.

Another embodiment of the invention is shown in FIGS. 4 and 5, and in the detail of FIGS. 6 and 7. Valve 81 has body 83, central member 91, disk 89, and seat 101. The disk 89 shows the greatest departure from flatness of all the disks shown herein; it is actually cup-shaped. The seat abuts body 83, and is connected to central member 91 by ribs 85. Central member 91 has a generally cup-shaped cross-section, which nearly mates with a portion of the disk 89, as shown. Disk 89 also includes a generally cylindrical portion which slides along the sealing rings 95 which are mounted on central member 91.

Ribs 87 guide the disk assembly, including stepped stem 97, in a manner similar to those described for the valves shown in FIGS. 1-3. Disk 89 is urged against seat 101 by spring 99. The sealing rings 95 are similar to those used in the other embodiment.

Mounted at the inlet end of the valve is pilot valve 93, which is a small check valve, more fully illustrated in FIGS. 6 and 7. Fluid flowing into the main valve enters through pilot valve 93. This fluid pushes directly against disk 89, which causes the disk to compress spring 99, and to enlarge the chamber 105, as shown in FIG. 5. When the disk 89 has moved away from seat 101, fluid can flow through the openings created, as indicated by arrows 103.

The details of the pilot valve 93 are shown in FIGS. 6 and 7. Pilot valve 93 includes body 119 which is adapted to be threaded into central member 91. The pilot valve has its own disk 111 which is urged by spring 113 against the body 119, a part of which defines a seat for the disk. Spring 113 is attached to guard 115, and the guard is also fastened around body 119 by retaining ring 109. Fluid enters the pilot valve 93 through inlet 107.

Disk 111 of pilot valve 93 has an orifice 117 which allows fluid in the valve to escape. When disk 89 of valve 81 is moving towards its seat, the compression of fluid in chamber 105 causes disk 111 to move towards its own seat, i.e. body 119. Under these conditions, fluid will flow slowly out of chamber 105, and out of the pilot valve 93. Thus, the damping of the main disk, i.e. disk 89, is achieved by providing a small check valve, i.e. pilot valve 93, at the inlet end of main valve 81, and by forming an orifice in the disk of the small check valve, to allow fluid to escape therefrom. Orifice 117 therefore functions in a manner similar to that of orifice 67 of FIGS. 2 and 3, providing controlled and predictable flow of fluid out of the damping chamber. This embodiment comprises a valve within a valve.

The embodiment of FIGS. 4 and 5 has the advantage that both the pilot valve and the small orifice can be combined on one structure. Virtually any standard check valve can be used for pilot valve 93, as long as it is provided with an orifice as shown. There is no need to drill a separate hole in the central member 91.

The embodiment of FIGS. 4 and 5 also has advantages due to its unique structure. The interior of valve 81 is larger, relative to the amount of material used to make the valve. The shape of body 83, and of disk 89 and central member 91, make it possible to obtain maximum flow passage inside the valve. In particular, the structure shown in FIGS. 4 and 5 reduces the heavy mass of the central member, in comparison to the embodiment of FIGS. 2 and 3.

It is understood that the use of a small pilot valve, such as valve 93, having an orifice in its disk, is not limited to use with the structure shown in FIGS. 4 and 5. The small pilot valve could also be used in the embodiment of FIGS. 2 and 3, instead of providing an orifice in the central member. Similarly, an orifice could be provided, if desired, in the central member 91 of valve 81, instead of using the small pilot valve. Thus, the structure shown for the valve body, disk, seat, etc. is generally independent of the means employed for venting the damping chamber.

While the invention has been described with respect to the specific embodiments shown in the figures, it is understood that many other variations are possible. The specific structure of the disks and the seats can be changed. The disks can be biased by springs, or by equivalent devices, or by gravity. The means of sealing the damping chamber against leakage can be modified. As mentioned above, many different types of commercially available check valves can be used instead of the specific pilot valve structure shown in FIG. 6. The disk structures can depart substantially from the appearance of a flat disk.

It is also possible to combine the seat and the central member of the pilot valve, in a manner analogous to that shown in FIG. 6, so that the seat and central member are, in fact, one piece. The springs shown in the figures can be replaced with equivalent devices for biasing the movement of the valve disk. These and other similar modifications are to be considered within the spirit and scope of the following claims.

What is claimed is:

1. A check valve apparatus, the valve apparatus having an inlet end and an outlet end, comprising:
   (a) a disk means and a seat means, the disk means being mounted for movement within a body, the disk means being biased by a spring means to abut the seat means, the disk means, when abutting the seat means, being located near a central member, the disk means being capable of moving away from the seat means in response to fluid flow originating from the inlet end of the valve,
   (b) the disk means including chamber defining means, wherein the disk means, when moved away from the seat means, and the central member together form a chamber for fluid,
   (c) pilot valve means, disposed at the inlet end of the apparatus, the pilot valve means fluidly communicating with the chamber, the pilot valve means allowing substantially unobstructed fluid flow from the inlet end towards the outlet end of the valve apparatus, the pilot valve means including an orifice means, the orifice means being of known size, wherein the orifice means provides a controlled path for fluid flow, out of the chamber, into the inlet end, and out of the valve, when the disk means is moving towards the seat means, and
   (d) means for sealing the space between the disk means and the central member, wherein the only path for flow of fluid, out of the chamber, when the disk means is moving towards the seat means, is through the orifice means of the pilot valve means.

2. The apparatus of claim 1, wherein the pilot valve means comprises a small check valve, the small check valve having a valve disk, the valve disk including an orifice.

3. The apparatus of claim 2, wherein the small check valve is mounted in the central member.

4. The valve of claim 3, wherein movement of the disk means away from the seat means opens an additional path for fluid flow from the inlet end towards the outlet end of the valve.

5. The apparatus of claim 1, wherein the valve provides a flow path for fluid through the valve, wherein the flow path is free of right-angle bends.

6. In a check valve, the valve having a valve element which is movable towards and away from a seat means in response to reversals of flow in a fluid line, the movement of the valve element opening and closing a path for fluid flow through the valve, the flow path being generally unobstructed and being free of right-angle bends, the valve element and the seat means together defining a chamber, the chamber being capable of being filled with fluid, wherein the fluid-filled chamber comprises a dashpot for dampening the movement of the valve element towards the seat means when the flow in the line is reversed, the improvement comprising an orifice provided in the chamber, the orifice being of known size, the orifice permitting the controlled flow of fluid out of the chamber when the valve chamber is moving towards the seat means, and when the fluid in the chamber is being compressed, and means for sealing the chamber against fluid flow, wherein the only path for fluid flow out of the chamber, when the valve element is moving towards the seat means, is through the orifice.

7. The improvement of claim 6, wherein the chamber is defined in part by a central member, and wherein there is an pilot check valve mounted on the central member, the pilot check valve having a disk, and wherein the orifice is provided in said disk, wherein the pilot check valve comprises means for permitting the flow of fluid into the chamber, and means for permitting fluid to flow out of the chamber when the valve element is moving towards the seat means.

8. An improved check valve, comprising:
   (a) a body,
   (b) a generally cylindrical seat means, attached to the body,
   (c) a central member, having a generally conical cross-section, the sides of the cone being inclined at an angle of approximately 45° from the direction of flow of fluid entering the valve, the central member being attached to the seat means,
   (d) inlet means for allowing the flow of fluid into the valve, the inlet means being disposed on the central member,
   (e) a movable valve element, the valve element having a chamber-defining portion which is shaped to mate generally with the central member, the valve element having a generally cylindrical portion for engaging the seat means, the valve element also including a portion for connecting the valve element to a spring means, wherein the valve element and the central member define a chamber for fluid, wherein the chamber is disposed so as to be filled with fluid when the valve element is pushed away from the seat means in response to fluid flow in a fluid line,
   (f) orifice means, of known size, disposed in the central member, for allowing the controlled flow of fluid out of the chamber when the valve element is moving toward the seat means, and
   (g) means for sealing the space between the valve element and the central member, wherein the only path for flow of fluid, out of the chamber, when the valve element is moving towards the seat means, is through the orifice means.

9. The valve of claim 8, wherein the inlet means comprises a pilot check valve, mounted on the central member, the pilot check valve including an inlet disk.

10. The valve of claim 9, wherein the orifice is provided on the inlet disk of the pilot check valve.

11. A check valve, the valve having an inlet end and an outlet end, the valve comprising:
   (a) a disk means and a seat means, the disk means being mounted for movement within the valve, the disk means being biased by a spring means to abut the seat means, the disk means, when abutting the seat means, being located near a central member, the disk means being capable of moving away from the seat means in response to fluid flow originating from the inlet end of the valve, and of opening a path for fluid flow through the valve, said fluid flow path being generally unobstructed, and being free of right-angle bends,
   (b) the disk means including chamber defining means, wherein the disk means and the central member together form a chamber for fluid,
   (c) orifice means, of known size, fluidly communicating with the chamber, the orifice means providing a path for controlled fluid flow out of the chamber, into the inlet end, and out of the valve, when the disk means is moving towards the seat means, and (d) means for sealing the space between the disk means and the central member, wherein the only path for flow of fluid, out of the chamber, when the disk means is moving towards the seat means, is through the orifice means.

12. In a check valve, the valve having a valve element which is movable towards and away from a seat means in response to reversals of flow in a fluid line, the movement of the valve element opening and closing a path for fluid flow through the valve, said path being generally unobstructed and being free of right-angle bends, the valve element and the seat means together defining a chamber, the chamber being capable of being filled with fluid, wherein the fluid-filled chamber comprises a dashpot for dampening the movement of the valve element towards the seat means when the flow in the line is reversed, the improvement comprising an orifice communicating with the chamber, the orifice being of known size, the orifice permitting the controlled flow of fluid out of the chamber when the valve element is moving towards the seat means, and when the fluid in the chamber is being compressed, and means for sealing the chamber, wherein the only path for flow of fluid, out of the chamber, when the disk means is moving towards the seat means, is through the orifice.

13. A check valve apparatus, the valve apparatus having an inlet end and an outlet end, comprising:
   (a) a disk means and a seat means, the disk means being mounted for movement within a body, the disk means being biased by a spring means to abut the seat means, the disk means, when abutting the seat means, being located near a central member, the disk means being capable of moving away from the seat means in response to fluid flow originating from the inlet end of the valve, so as to open a path for flow of fluid through the valve,
   (b) the central member having a generally conical crosssection, the sides of the cone being inclined at an angle of approximately 45° from the direction of flow of fluid entering the valve, wherein the flow path is generally unobstructed and is free of right-angle bends,
   (c) the disk means including chamber defining means, wherein the disk means, when moved away from the seat means, and the central member together form a chamber for fluid,
   (d) a pilot check valve, disposed at the inlet end of the apparatus, the pilot valve fluidly communicating with the chamber, the pilot valve allowing substantially unobstructed fluid flow from the inlet end towards the outlet end of the apparatus, the pilot valve including a disk having an orifice, the orifice being of known size, wherein the orifice provides a path for controlled fluid flow, out of the chamber, into the inlet end, and out of the apparatus, when the disk is moving towards the seat means, and
   (e) means for sealing the space between the disk means and the central member, wherein the only path for flow of fluid, out of the chamber, when the disk means is moving towards the seat means, is through the pilot valve.

14. In a check valve, the valve having a valve element which is movable towards and away from a seat in response to reversals of flow in a fluid line, the movement of the valve element opening and closing a path for fluid flow through the valve, the valve element and the seat together defining a chamber, the chamber being capable of being filled with fluid, wherein the fluid-filled chamber comprises a dashpot for dampening the movement of the valve element towards the seat when the flow in the line is reversed, the improvement comprising:
   (a) a central member having a cross-section which is generally conically shaped, the sides of the cone being inclined at an angle of about 45°, from the direction of flow of fluid into the valve, wherein the central member guides the flow of fluid through the valve, when the valve element has moved away from the seat, along a path which is generally unobstructed and which is free of right-angle bends,
   (b) an orifice provided in the chamber, the orifice being of known size, the orifice permitting the controlled flow of fluid out of the chamber when the valve element is moving towards the seat, and when the fluid in the chamber is being compressed, and
   (c) means for sealing the chamber against fluid flow, wherein the only path for fluid flow out of the chamber, when the valve element is moving towards the seat means, is through the orifice.

* * * * *